Sept. 6, 1938.  E. A. I. JOHANSSON  2,129,582
MEASURING TAPE
Filed Dec. 10, 1935
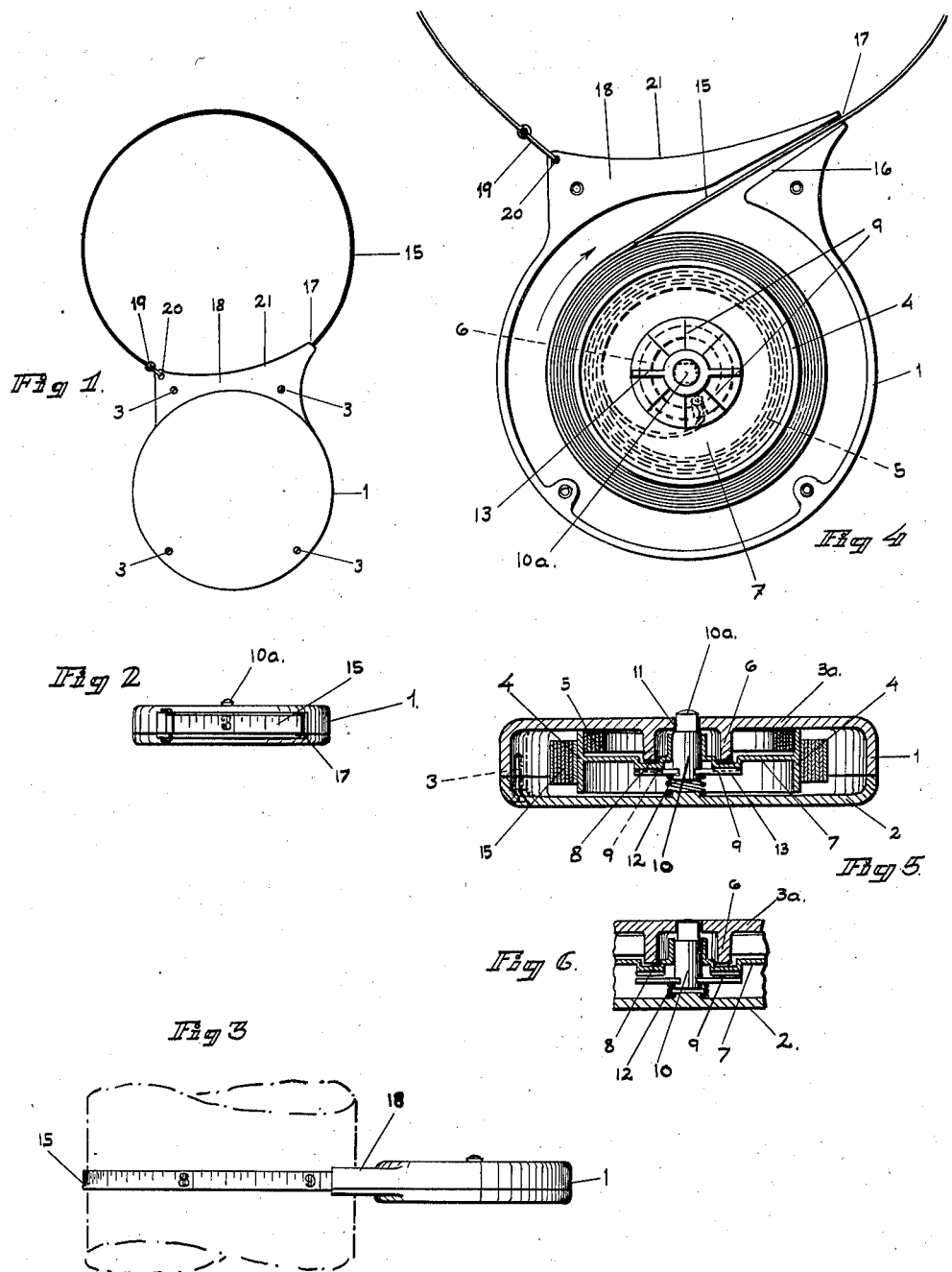
INVENTOR.
EBBE A. I. JOHANSSON
BY
William C. Linton
ATTORNEY.

Patented Sept. 6, 1938

2,129,582

UNITED STATES PATENT OFFICE 2,129,582

MEASURING TAPE

Ebbe Anders Israel Johansson, Smalandsstenar, Sweden

Application December 10, 1935, Serial No. 53,808
In Sweden November 27, 1934

1 Claim. (Cl. 33—179)

The present invention relates to devices for measuring the circumference of objects which devices consist of a graduated flexible tape, the one end of which is secured to the outer circumference of a casing and the other end of which is secured to and wound upon a drum rotatably mounted within the casing and actuated by a spring, against the action of which the tape may be pulled out of the casing through an opening in the wall of the casing situated on a distance from the point, where the outer end of the tape is secured to the casing.

More particularly the invention relates to devices of the kind referred to which are provided on the one hand with a ratchet mechanism which temporarily keeps the drum against the action of the spring, and on the other hand with a releasing mechanism accessible from the outside of the casing and adapted to bring the ratchet mechanism out of operative position so as to permit the spring to automatically pull in the tape into the casing.

The object of the invention is to provide an improved measuring device of the kind referred to which is simple in construction and which may easily be manipulated with one hand so as to enable a person to measure the circumference on different places of his arms in order to control the result on the muscles of gymnastic exercises or the like.

In the accompanying drawing Figure 1 is a side view of a measuring device constructed in accordance with my invention. Figures 2 and 3 show the measuring device seen from two other sides. Figure 4 is a side view of the device on a larger scale with some parts removed. Figure 5 is a transverse sectional view of the device, and Figure 6 shows certain details of the device in another working position.

Referring to the drawing by numerals, 1 denotes a casing of substantially circular shape, the one side wall 2 of which is secured by means of screws 3. Within said casing there is rotatably mounted a drum 4, within which there is located a spring 5, the one end of which is secured to the drum, while the other end is secured to an annular, central portion 6 of the casing. The drum 4 is provided with a partition wall 7, which is at the one side provided with an annular groove 8 embracing the annular portion 6 of the casing, and at the other side with a series of teeth 9. Centrally in the casing there is provided a pin 10 the one end 10a of which projects through a hole 11 in the side wall 3a of the casing. The hole 11 has a square shape and the end 10a of the pin 10 has a square cross section, so as to prevent the pin 10 from rotating. Between the inner end of the pin 10 and the cover or side wall 3 there is inserted a spring 12 which tends to keep a cross pin 13, secured to the inner end of the pin 10, into contact with the teeth 9. These teeth are so formed that, when the cross pin 13 occupies the operative position shown in Figure 5, the drum 4 may be rotated in the direction indicated by the arrow in Figure 4 but not in the opposite direction. If the pin 10 be pushed to the position shown in Figure 6 the cross pin 13 will be brought out of contact with the teeth so that the drum 4 may be rotated in both directions.

To the drum 4 there is secured the one end of a flexible graduated tape 15, which is wound on the drum and the other end of which is passed through a channel 16 formed in the wall of the casing. The outer orifice 17 of said channel 16 is located at the one end of a radially projecting portion 18 of the casing, and to the other end of said portion 18 the outer end of the tape 15 is secured by means of a loop or eye 19 passing through a hole 20 in said portion 18. The surface 21 of the portion 18 which is located between the orifice 17 of the channel 16 and the hole 20 has a concave shape, and the graduation of the tape begins with a value, which corresponds to the lengths of said surface 21.

If a person wishes to measure the circumference of for instance his left forearm he pulls a suitable length of the tape out of the casing, whereupon he inserts his left arm (indicated by dotted lines in Figure 3) in the loop thereby formed by the tape, keeping the casing with his right hand. If he pushes the pin 10 to the position shown in Figure 6 and keeps the concave surface 21 of the projection 18 against the arm, the spring 5 will rotate the drum 4 on which the tape 15 will be wound until the portion of the tape pulled out of the casing places itself around the arm (see Figure 3). Owing to the fact that the graduation of the tape begins with a value including the length of the concave face 21 of the projection 18 the size of the circumference of the arm may be directly read on the tape at the outer orifice 17 of the channel 16.

Having thus described my invention, I claim:

A device for measuring the periphery of cylindrical objects comprising in combination a casing, a graduated flexible tape coiled within said casing, resilient means tending to hold said tape in its coiled position and a portion of said casing extended to form a shoulder thereon and having the length of the outer face thereof concave, said portion having a passageway for said tape formed therethrough from one end of said concave side to the interior of said casing, said passageway being substantially parallel to the adjacent end portion of the concave side of said shoulder, means connecting the end of said tape extending through said passageway to the opposite end of said concave side and graduations of said tape beginning at the joined end thereof with a value equal to the length of said concave side of said shoulder.

EBBE ANDERS ISRAEL JOHANSSON.